United States Patent
Avkarogullari et al.

(10) Patent No.: US 9,442,706 B2
(45) Date of Patent: Sep. 13, 2016

(54) COMBINING COMPUTE TASKS FOR A GRAPHICS PROCESSING UNIT

(71) Applicant: Apple Inc., Cupertino, CA (US)

(72) Inventors: Gokhan Avkarogullari, San Jose, CA (US); Alexander K. Kan, San Francisco, CA (US); Kelvin C. Chiu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/448,927

(22) Filed: Jul. 31, 2014

(65) Prior Publication Data
US 2015/0347105 A1    Dec. 3, 2015

Related U.S. Application Data

(60) Provisional application No. 62/005,979, filed on May 30, 2014.

(51) Int. Cl.
G06F 9/45      (2006.01)
G06F 9/445     (2006.01)

(52) U.S. Cl.
CPC .............. *G06F 8/4441* (2013.01); *G06F 9/445* (2013.01); *G06F 9/44505* (2013.01)

(58) Field of Classification Search
None
See application file for complete search history.

(56) References Cited

U.S. PATENT DOCUMENTS

| | | | | |
|---|---|---|---|---|
| 8,610,731 B2* | 12/2013 | Bhoovaraghavan | .... | G06T 11/40 345/501 |
| 8,707,314 B2* | 4/2014 | Gummaraju et al. | ........ | 718/102 |
| 8,856,760 B2* | 10/2014 | Heirich | ..................... | G06F 8/20 717/124 |
| 2003/0074247 A1* | 4/2003 | Dick | ....................... | G06Q 10/06 705/7.15 |
| 2006/0095902 A1* | 5/2006 | Nakaike | ................ | G06F 1/3203 717/158 |
| 2011/0022817 A1* | 1/2011 | Gaster | .................... | G06F 9/5044 711/202 |
| 2011/0161944 A1* | 6/2011 | Cho | ......................... | G06F 8/433 717/149 |
| 2012/0016701 A1* | 1/2012 | Narendra | ............. | G06Q 10/063 705/7.11 |
| 2012/0233597 A1* | 9/2012 | Ogasawara | ........... | G06F 8/4441 717/124 |
| 2012/0320070 A1* | 12/2012 | Arvo | ...................... | G06F 9/5033 345/522 |
| 2013/0080805 A1* | 3/2013 | Vick | ...................... | G06F 8/4432 713/320 |
| 2013/0160016 A1 | 6/2013 | Gummaraju | | |
| 2014/0019305 A1* | 1/2014 | Shetty | .................... | G06Q 30/06 705/27.1 |
| 2014/0078156 A1 | 3/2014 | Carroll | | |

(Continued)

OTHER PUBLICATIONS

Mrinal Deo et al., Title: Parallel Suffix Array and Least Common Prefix for the GPU, Feb. 23-27, 2013, Shenzhen, China, ACM 2013.*

(Continued)

*Primary Examiner* — Wei Zhen
*Assistant Examiner* — Hossain Morshed
(74) *Attorney, Agent, or Firm* — Blank Rome LLP

(57) ABSTRACT

Methods, systems and devices are disclosed to examine developer supplied graphics code and attributes at run-time. The graphics code designed for execution on a graphics processing unit (GPU) utilizing a coding language such as OpenCL or OpenGL which provides for run-time analysis by a driver, code generator, and compiler. Developer supplied code and attributes can be analyzed and altered based on the execution capabilities and performance criteria of a GPU on which the code is about to be executed. In general, reducing the number of developer defined work items or work groups can reduce the initialization cost of the GPU with respect to the work to be performed and result in an overall optimization of the machine code. Manipulation code can be added to adjust the supplied code in a manner similar to unrolling a loop to improve execution performance.

15 Claims, 4 Drawing Sheets

(56) References Cited

U.S. PATENT DOCUMENTS

2014/0156971 A1* 6/2014 Kunze ................. G06F 9/30036
712/42
2014/0344793 A1* 11/2014 Lee ......................... G06F 8/452
717/150

OTHER PUBLICATIONS

Deo, "Parallel Suffix Array and Least Common Prefix for the GPU", 2013 ACM978-1-4503-1922—May 13, 2002.*

* cited by examiner

GLOBAL WORKSPACE

COMBINE TO REDUCE TOTAL OVERHEAD FROM 4X to 1X plus MANIP CODE. WORK REMAINS CONSTANT AT 4C 500 WGS OF 4 WORK ITEMS EACH
COST IS 500 A + 2000 B + 2000 C
COMBINE 10 GROUPS INTO 1 (FIG 3)
REDUCES COST TO 50(A + M1) + 2000 B + 2000 C
NOW WGS HAVE 40 ITEMS EACH
COMBINE 20 WORK ITEMS (PIXELS) TOGETHER (FIG 2)
REDUCES COST TO 50(A + M1) + 100(B + M2) + 2000 C

COMBINING COMPUTE TASKS FOR A GRAPHICS PROCESSING UNIT

BACKGROUND

This disclosure relates generally to the field of general-purpose computing on graphics processing units (GPGPU) and how to perform optimization on developer defined workgroup characteristics. More particularly, but not by way of limitation, this disclosure relates to techniques for coalescing (e.g., combining) work items in a workgroup when the workgroup size appears large and aliasing workgroups to coalesce work items from different workgroups when the workgroup size appears too small. In some instances these two techniques can be used together to reduce overall overhead associated with a work task.

In the field of parallel computing utilizing Graphics Processing Units (GPUs), several computing languages are available. For example, OpenCL and OpenGL are standards utilized by developers to interface with GPUs. GPUs can have many cores that run in parallel to process programs called "kernels" where each kernel will process over a number of work items in parallel. A developer will define the "best" N-dimensioned index space for their algorithm. Kernels are then executed by the GPU across a global domain of work items while the work items are grouped into local work groups. For example the global dimension may be 1024 by 1024 pixels and represent the whole problem space with a plurality of work groups executing together across a set of 32 by 32 local dimensions. That is, the work is defined as global work divided into a set of work groups which are in turn divided into a set of work items.

To load a work group to a GPU, it is required to initialize data associated with the work group and to load functional code associated with each work group and metadata associated with each work item. This load (initialization) time represents an amount of overhead in addition to the overhead of actually doing the work of all the work items within the work group. Because the developer cannot predict the technical capabilities that might be available at a future run-time for their application it is not always practical for a developer to tune for "optimal" parameters for a given hardware platform.

SUMMARY

This disclosure relates to how a driver, compiler and/or code generator produce executable code for a GPU at run-time. For example, the generation of a kernel to execute on one or more cores and processing elements of a GPU. More specifically, this disclosure relates to how a particular graphics kernel for a GPU is prepared at run-time based on compiler and driver interaction, the interaction taking into account capabilities and performance characteristics of the run-time hardware. In general, smaller work groups can be run in parallel across multiple cores of a GPU with each work group running on a single core. Further, a plurality of work items can be coalesced into a single work group to reduce the overhead of loading the plurality of work items. The incremental cost of the manipulation code added as a result of coalescing can be less than the overhead associated with repeated loading of metadata associated with the plurality of work items.

DETAILED DESCRIPTION

Figure 1:
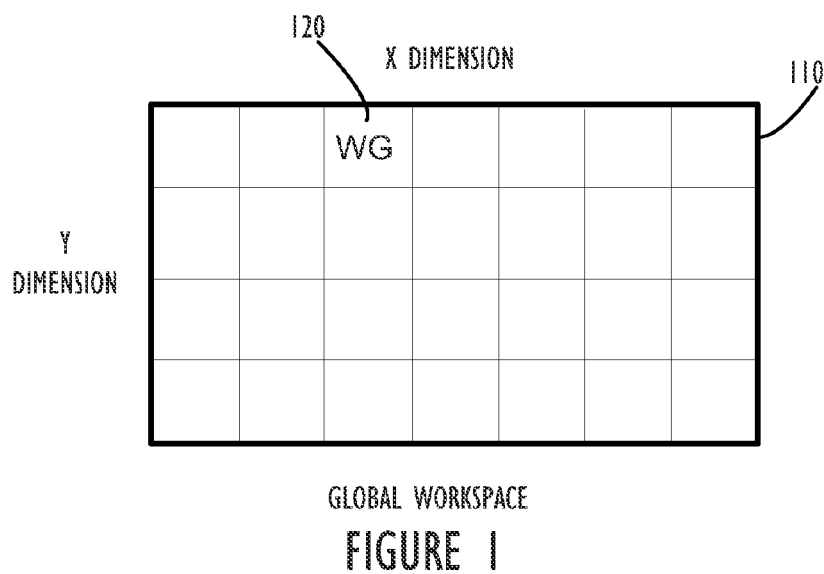
FIG. 1 illustrates a global workspace representing a plurality of work groups according to the disclosed embodiments.

This disclosure pertains to systems, methods, and computer readable media to improve hardware utilization. In general, techniques are disclosed for combining a plurality of work items into a single work item by adding code into the newly formed single work item to "unroll" the kernel so that it can act across more instances than defined by the developer. Additionally, a plurality of work groups can be combined into a single work group to reduce the overall number of work groups that must be initialized on given hardware. More particularly, techniques disclosed herein may alter the designation of work items, instances of work items, and total numbers of work groups to more closely match performance characteristics of the run-time hardware.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system-related constraints and/or business-related constraints), and that these goals may vary from one implementation to another. It will also be appreciated that such development efforts might be complex and time-consuming, but would nevertheless be a routine undertaking for those of ordinary skill in the design of an implementation of image processing systems having the benefit of this disclosure.

Different processing chips have different overhead criteria for different operations. For example, some chips may have more efficient memory access capabilities while others may have more efficient processing implementations (among other attributes). This disclosure describes optimization techniques that can be used in the area of graphics processing on GPUs. In particular, this disclosure relates to methods and systems that can alter code at run-time with knowledge of the run-time hardware to override the characteristics defined by a developer at development time. The plurality of different hardware processors available in the market today may make it impractical for a developer to predict the best segregation of graphics processing work for any give GPU.

Referring to FIG. 1, the displayed block diagram illustrates a global workspace 110 with an X dimension and a Y dimension divided into a plurality of work groups 120. The size of the workgroup is defined by a developer at code development time. As mentioned above, the developer is likely not aware of the specific hardware that may impact the execution of code at run-time. As one of ordinary skill in the art is aware, languages such as OpenCL and OpenGL cause the invocation of a driver, compiler and code generator (for example) at run-time to create the kernels or shaders that are actually executed on the GPU. Loading of each workgroup and loading metadata associated with each work item of a workgroup can have an associated overhead. By reducing the total number of workgroups (or work items within a work group) some optimizations may be obtained. In general if a work group is too small it requires more overhead to load than might be most efficient because of redundant loading of substantially similar information. If a work group is too large it can adversely affect the amount of parallel work that can be performed by the GPU. In the following examples the cost of doing real work is referenced with the variable "C," the cost of doing pixel load of associated metadata is referenced with the variable "B," the cost of doing a work group load/initialization is referenced with the variable "A," and the manipulation costs associated with combinations and coalescing are referenced with M1 and M2 as appropriate.

Figure 2:
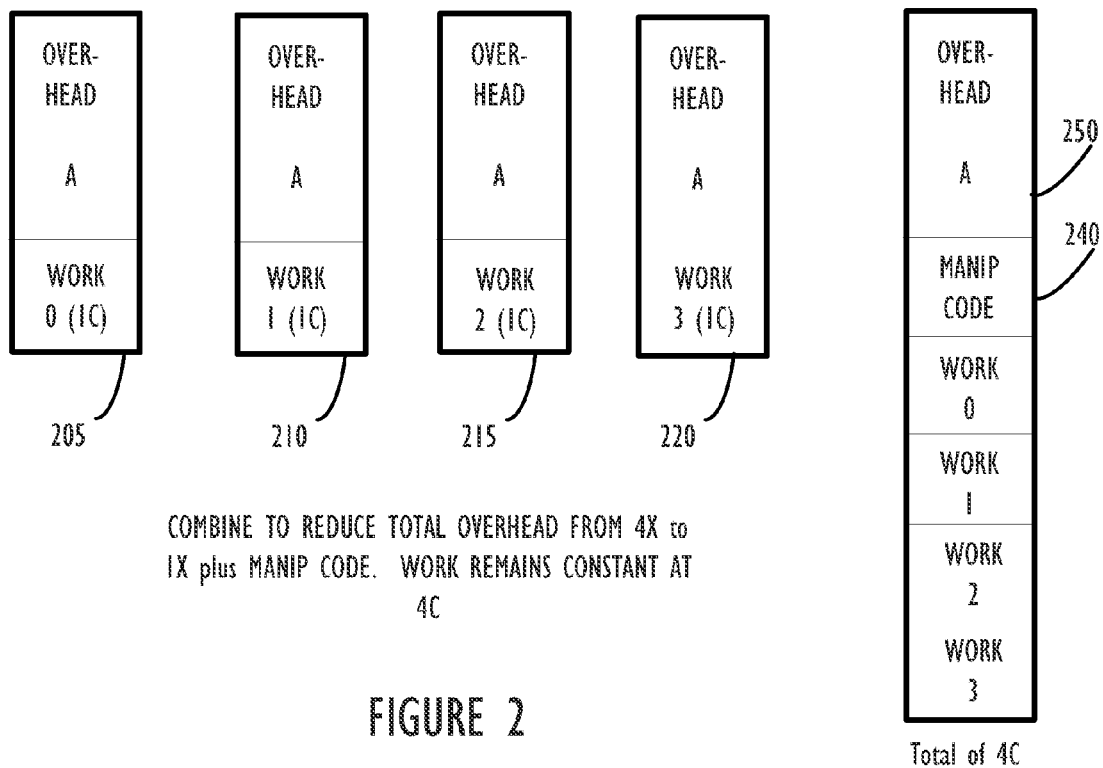
FIG. 2 illustrates in block diagram form a reduction in overhead by coalescing four work items into one work item according to the disclosed embodiments.

Referring to FIG. 2, which illustrates a combination of four work items into a single work item. Work items 205, 210, 215 and 220 represent the overhead and actual work required when processing 4 work items. Each work item has an overhead A to load. When the information (e.g., metadata) is similar in nature there can exist a possibility of combining the information and adding a manipulation code (240) to adjust at run-time across the similar metadata. For example, if the only information different between work items 205 and 210 are pixel locations in the output, an offset calculation can be added to take into account the offset of the resultant location. This can allow the combination of metadata across work items 205 and 210 so that the common information is only uploaded to the GPU one time. The additional cost is the manipulation code which can in some situations be less than the overhead A and thus result in an overall savings. This concept is illustrated in FIG. 2 with a combination of four work items (205, 210, 215 and 220) which adds the additional overhead of manipulation code M1 (240) while reducing the overhead by 3A. The work for the actual pixels remains constant (C). As a result the total work to process the single combined work items can be represented by 1A (250) plus manipulation code M1 (240) plus the actual work 0, 1, 2 and 3 (four times C).

Figure 3:
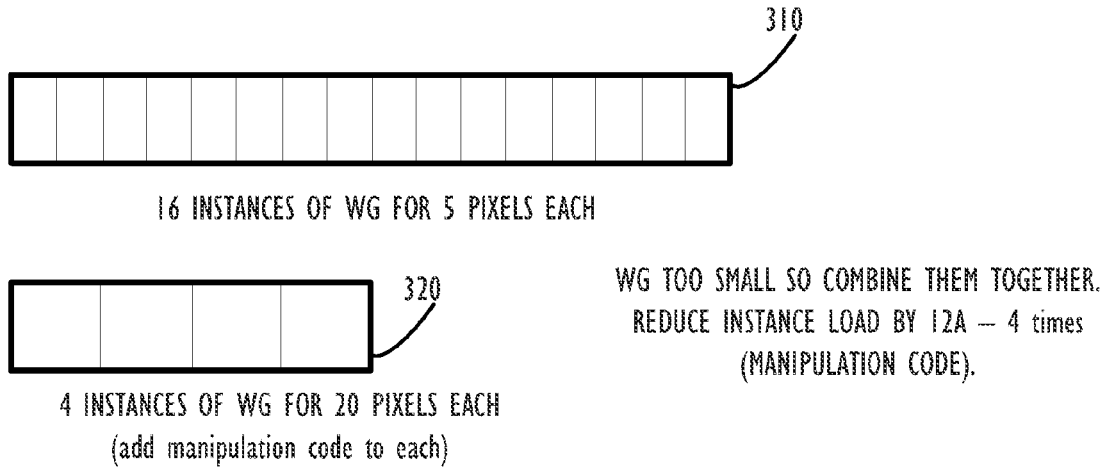
FIG. 3 illustrates a combination of work groups that reduce the total number of work groups and thereby reduce total overall overhead according to the disclosed embodiments.

Referring now to FIG. 3 illustrating a different kind of optimization to again reduce overhead of initializing a GPU. In FIG. 3 we have 16 work groups of 5 pixels each (310). We can combine work groups together to reduce the overall number of work groups and increase the amount of pixels calculated by each work group. In this example we change the number of pixels per work group from 5 to 20. The result (320) illustrates that we have 4 work group instances of 20 pixels each. The overhead cost is therefore reduced from 16A (cost of initializing each of the original work group) to 4A (initializing 4 work groups) plus the cost of manipulation code that may be required when combining the work groups. This example results in a savings of 12A (minus four times overhead of manipulation code M2). Note that the processing performed to combine and generate the new format of work groups can be performed by a driver and compiler automatically at run-time and not affect either the developer or the end user.

Figure 4:
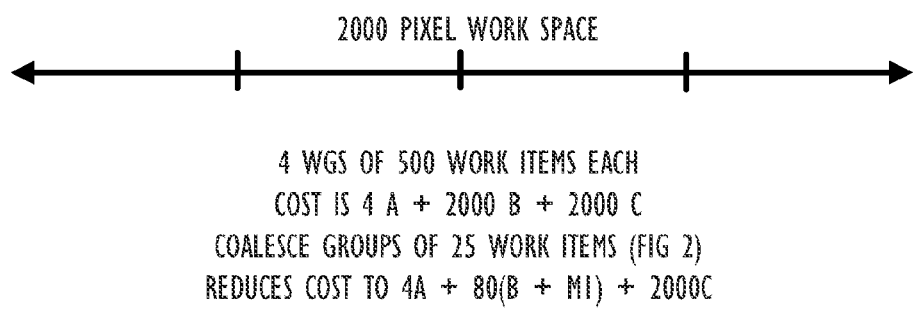
FIG. 4 illustrates a reduction in cost associated with coalescing of work items within a work group according to the disclosed embodiments.

Referring now to FIG. 4 illustrating an example of four work groups of 500 work items each. The developer supplied information would result in a cost of 4 work group loads and processing of 2000 pixel loads B and 2000 elements of real work C. In this example we use the technique of FIG. 2 to coalesce the 500 work items A into groups of 25 work items A. This can reduce the cost of 500A to 80A (500 divided by 25) because of the combination of the work items. The incremental cost would be the manipulation code M1 associated with the 80 coalesced work items but the reduction in cost would be the savings of 24 times 4 work item loads A. The overall savings by eliminating these 96 work item loads could be substantially less than the incremental cost and result in a more efficient run-time program.

Figure 5:
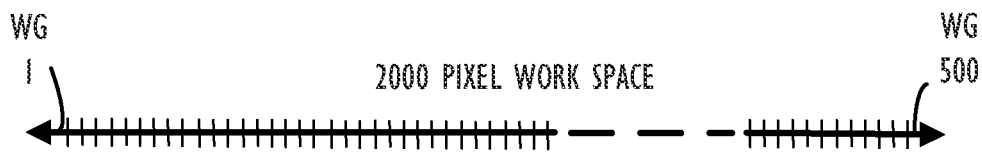
FIG. 5 illustrates a combined reduction of cost associated with both combinations of work groups and coalescing of work items according to the disclosed embodiments.

Referring now to FIG. 5 illustrating a possible combination of the two optimizations discussed above with respect to FIGS. 2 and 3. FIG. 5 illustrates a case of 500 work groups of 4 items each to calculate a 2000 pixel work space. Initially the cost associated with this developer supplied input is the cost of loading 500 work groups A plus 2000 pixel work item loads B plus 2000 elements of real work C. That is, 500A+2000B+2000C. As an initial step analysis can be performed to determine if multiple work groups can be combined into a single work group. In this example we can combine 10 original work groups into a single work group resulting in a reduction (500/10) to 50 total work groups. The incremental cost is the cost of manipulation code (M1) associated with the combining of the work groups. The cost savings can be represented by a reduction of 450 work group loads. In general the overhead of M1 can be measurably less than the cost of 450 work group loads. Next, an analysis can be performed to determine if multiple work items (now there are 40 work items in each combined work group) within a work group can be coalesced into a single work item. In this example we can combine 20 work items into a single work item and add manipulation code to adjust at run-time to take into account adjustments required by the coalescing. The reduction in cost can be thought of as reducing the work item loads by a factor of 20 so that 2000 loads are reduced to 100 (e.g., 2000/20). The overall cost of the combined and coalesced code can then be represented by 50(A+M1)+100(B+M2)+2000C instead of the original 500A+2000B+2000C. As explained above, 2000C represents the real work performed on each pixel and remains unaffected by the combining and coalescing. Clearly, if 50M1 is less than 450A and 100M2 is less than 1900B we have achieved an overall performance improvement.

The following example code portions can further illustrate the embodiments described above. These code modifications are illustrative only and can be made without external visibility or interaction by either the developer or the user because they can be made automatically by the driver, code generator, and/or compiler as described above.

As an example in Table 1 below there is a simple OpenCL kernel (squares the input array and writes out to output array):

TABLE 1

```
__global float* input,
__global float* output)
{
    int i = get_global_id(0);
    output[i] = input[i] * input[i];
}
```

In this example the user will launch the above kernel with a global size of 1024×1×1 and workgroup size of 32×1×1. Note that the global size will match the input/output array size. Essentially this will run 1024 instances of this program/kernel in parallel. Each instance of the program will find out its global id and find the correct index to load from input array and perform calculation to write out to output array.

Table 2 below shows another example (1D convolution that computes 3 terms, a(x−1)+bx+c(x+1)):

TABLE 2

```
// These can be any convolution coefficients
#define A (1.0)
#define B (1.0)
#define C (1.0)
__kernel void square(
    __global float* input,
    __global float* output)
{
    __local float cache[512+2];        // local memory is fast memory
                                       // that's shared and visible for
                                       // a given workgroup
    int lid = get_local_id(0);
    int gid = get_global_id(0);
    // If its first instance in the workgroup pull all the
    // input memory first
    if (lid == 0)
    {
        for (int i=0; i<512+2; i++)
        {
            cache[i] = input[gid−1+i];
        }
    }
    // This is so all instances in the workgroup wait for everything
    // in cache to be populated
    barrier( );
    // Perform per instance calculation
    output[gid] = A*cache[lid] + B*cache[lid+1] + C*cache[lid+2];
}
```

In the example of Table 2, the user can launch the above kernel with a global size of 4096×1×1 and workgroup size of 512×1×1. The workgroup above allows reuse of memory fetches from the input, e.g., multiple instances will access the same input memory multiple times. For this example, 3 global memory accesses are turned into 1 global memory access+3 local memory accesses. One of ordinary skill in the art will understand that, given this disclosure, higher term convolutions such as a 2D convolution could have more savings. (The reason there's the concept of workgroup is to leverage or share memory/calculations across instances.)

The code sample of Table 3 below includes comments to explain concepts of eliminating loading overhead related to embodiments of this disclosure for the above code sample.

TABLE 3

```
__kernel void square(
    __global float* input,
    __global float* output)
{
```

TABLE 3-continued

```
    __local float cache[512+2];
    int lid = get_local_id(0);     // Generate a unique local
                                   // id per instance before program launch
                                   //
    int gid = get_global_id(0);    // Generate a unique global
                                   // id per workgroup before program launch
    if (lid == 0)
    {
    for (int i=0; i<512+2; i++)
        {
            cache[i] = input[gid−1+i];
        }
    }
    barrier( ); // Track the number of instances.
    output[gid] = A * cache[lid] + B * cache[lid+1] + C * cache[lid+2];
}
```

Due to the nature of certain hardware the comments above explain where substantial overhead might exist. To overcome the limitations of the hardware the following code sample of Table 4 illustrates some possible modifications that could be made automatically in accordance with this disclosure to address the issues of the run-time hardware. For example the multiple work items in a workgroup could be coalesced to amortize the cost of each work item.

TABLE 4

```
global size (1024 x 1 x 1)
__kernel void square(
    __global float* input,
    __global float* output)
{
    int i = get_global_id(0);
    output[i] = input[i] * input[i];
}
// Can be changed into this (Assume a grouping of multiples of 32
// instances)
global size (32 x 1 x 1)
__kernel void square(
    __global float* input,
    __global float* output)
{
    int k = get_global_id(0);
    for (int j=0; j<32; j++)
    {
        int i = k * 32 + j;
        output[i] = input[i] * input[i];
    }
}
```

Figure 6:
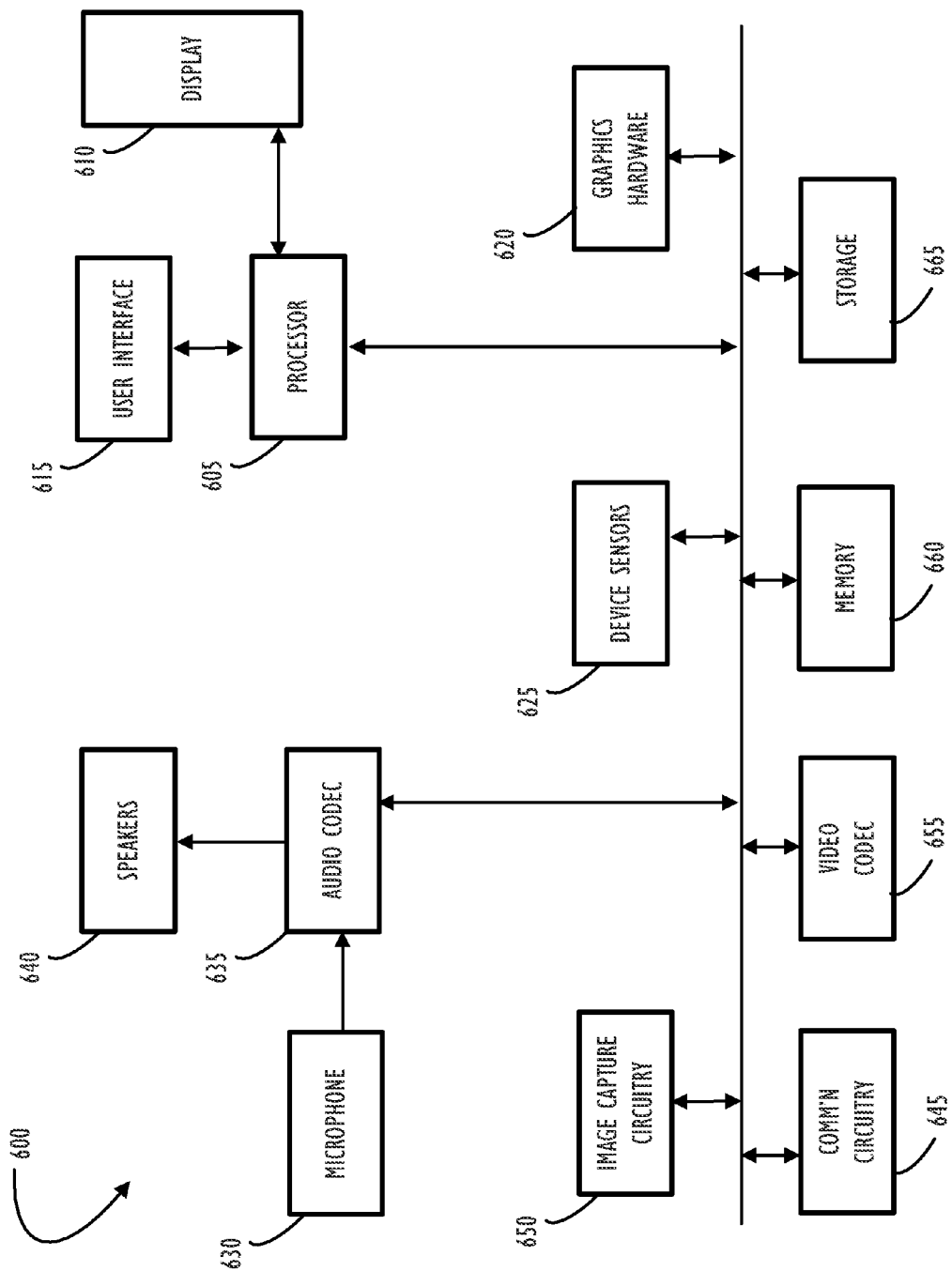
FIG. 6 illustrates a block diagram of one example of hardware suitable to implement the concepts of this disclosure.

Referring to FIG. 6, a simplified functional block diagram of illustrative electronic device 600 is shown according to one embodiment. Electronic device 600 could be, for example, a mobile telephone, personal media device, portable camera, or a tablet, notebook or desktop computer system. As shown, electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, image capture circuit or unit 650, video codec(s) 655, memory 660, storage 665, and communications bus 670.

Processor 605 may execute instructions necessary to carry out or control the operation of many functions performed by device 600 (e.g., such as the generation and/or processing of images in accordance with FIGS. 1 through 5). Processor 605 may, for instance, drive display 610 and receive user input from user interface 615. User interface 615 can take a variety of forms, such as a button, keypad, dial, a click wheel, keyboard, display screen and/or a touch screen.

Processor 605 may be a system-on-chip such as those found in mobile devices and include one or more dedicated graphics processing units (GPUs). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 perform computational tasks. In one embodiment, graphics hardware 620 may include one or more programmable graphics processing units (GPUs).

Image capture circuitry 650 may capture still and video images that may be processed to generate images. Output from image capture circuitry 650 may be processed, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605, graphics hardware 620, and image capture circuitry 650 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to retain computer program instructions or code organized into one or more modules and written in any desired computer programming language. When executed by, for example, processor 605 such computer program code may implement one or more of the methods described herein.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). For example, the processing could be any of coalescing work items within a work group as in FIG. 2, combining work groups together to reduce the overall number of work groups as in FIG. 3, or a combination of both as described in FIG. 5 in accordance with the disclosed embodiments. In one or more embodiments, one or more of the steps may be omitted, repeated, and/or performed in a different order. Accordingly, the specific arrangement of steps described in this detailed description and explained with respect to FIG. 5 should not be construed as limiting the scope of the technique. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method of processing code, the method comprising:
    obtaining a portion of the code that includes a first work group having a first work item, a second work group having a second work item, and attributes containing developer supplied criteria, the code and attributes describing execution parameters for a graphics processing unit (GPU), and each of the first and second work items having an execution overhead;
    analyzing the portion of the code and attributes with at least one of a compiler or driver;
    generating an altered code portion based on capabilities of the GPU by merging the first work group with the second work group to form a single merged work group that includes the first and second work items;
    coalescing the first and second work items of the altered code portion to form an altered and coalesced code portion, the altered and coalesced code portion comprising manipulation code to automatically adjust, at run-time, code elements affected by the coalescing, wherein a cost of executing the manipulation code is less than a cost of executing eliminated execution overhead resulting from the coalescing;
    compiling the altered and coalesced code portion; and
    loading the compiled altered and coalesced code portion for execution on the GPU.

2. The method of claim 1, wherein the analysis includes:
    determining that a size of at least one of the first or second workgroups is:
        equal to or greater than a first predetermined size, or
        equal to or less than a second predetermined size.

3. The method of claim 1, wherein the analysis includes:
    determining that metadata associated with the first work item and metadata associated with the second work item are similar.

4. The method of claim 1 wherein the merged work group comprises manipulation code to automatically adjust, at run-time, code elements affected by the merging.

5. The method of claim 4 wherein a cost of executing the manipulation code is less than a cost of executing eliminated overhead resulting from the merging.

6. A non-transitory computer readable medium comprising instructions stored thereon that when executed by a processor cause the processor to:
    obtain a portion of code that includes a first work group having a first work item, a second work group having a second work item, and attributes containing developer supplied criteria, the code and attributes describing execution parameters for a graphics processing unit (GPU), and each of the first and second work items having an execution overhead;
    analyze the portion of the code and attributes with at least one of a compiler or driver;
    generate an altered code portion based on capabilities of the GPU by merging the first work group with the second work group to form a single merged work group that includes the first and second work items;
    coalesce the first and second work items of the altered code portion to form an altered and coalesced code portion, the altered and coalesced code portion comprising manipulation code to automatically adjust, at run-time, code elements affected by the coalescing, wherein a cost of executing the manipulation code is less than a cost of executing eliminated execution overhead resulting from the coalescing;
    compile the altered and coalesced code portion; and
    load the compiled altered and coalesced code portion for execution on the GPU.

7. The non-transitory computer readable medium of claim 6, wherein the instructions to cause the processor to analyze the portion of the code and attributes includes instructions to cause the processor to:

determine that a size of at least one of the first or second workgroups is:
equal to or greater than a first predetermined size, or equal to or less than a second predetermined size.

8. The non-transitory computer readable medium of claim 6, wherein the instructions to cause the processor to analyze the portion of the code and attributes includes instructions to cause the processor to:
determine that metadata associated with the first work item and metadata associated with the second work item are similar.

9. The non-transitory computer readable medium of claim 6, wherein the merged work group comprises manipulation code to automatically adjust, at run-time, code elements affected by the merging.

10. The non-transitory computer readable medium of claim 9, wherein a cost of executing the manipulation code is less than a cost of executing eliminated overhead resulting from the merging.

11. A system comprising:
a memory for storing instructions and data;
a graphics processing unit (GPU); and
a central processing unit (CPU) wherein the CPU utilizes the instructions and the data to cause the CPU to:
obtain a portion of code that includes a first work group having a first work item, a second work group having a second work item, and attributes containing developer supplied criteria, the code and attributes describing execution parameters for a graphics processing unit (GPU), and each of the first and second work items having an execution overhead;
analyze the portion of the code and attributes with at least one of a compiler or driver;
generate an altered code portion based on capabilities of the GPU by merging the first work group with the second work group to form a single merged work group that includes the first and second work items;
coalesce the first and second work items of the altered code portion to form an altered and coalesced code portion, the altered and coalesced code portion comprising manipulation code to automatically adjust, at run-time, code elements affected by the coalescing, wherein a cost of executing the manipulation code is less than a cost of executing eliminated execution overhead resulting from the coalescing;
compile the altered and coalesced code portion; and
load the compiled altered and coalesced code portion for execution on the GPU.

12. The system of claim 11, wherein the instructions and the data utilized by the CPU to cause the CPU to analyze the portion of the code and attributes includes instructions and data to cause the CPU to:
determine that a size of at least one of the first or second workgroups is:
equal to or greater than a first predetermined size, or equal to or less than a second predetermined size.

13. The system of claim 11, wherein the instructions and the data utilized by the CPU to cause the CPU to analyze the portion of the code and attributes includes instructions and data to cause the CPU to:
determine that metadata associated with the first work item and metadata associated with the second work item are similar.

14. The system of claim 11, wherein the merged work group comprises manipulation code to automatically adjust, at run-time, code elements affected by the merging.

15. The system of claim 14, wherein a cost of executing the manipulation code is less than a cost of executing eliminated overhead resulting from the merging.

* * * * *